US 6,697,564 B1

(12) United States Patent
Toklu et al.

(10) Patent No.: US 6,697,564 B1
(45) Date of Patent: Feb. 24, 2004

(54) METHOD AND SYSTEM FOR VIDEO BROWSING AND EDITING BY EMPLOYING AUDIO

(75) Inventors: Candemir Toklu, Plainsboro, NJ (US); Shih-Ping Liou, West Windsor, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/518,300

(22) Filed: Mar. 3, 2000

(51) Int. Cl.[7] .............................. H04N 5/93; H04N 7/04
(52) U.S. Cl. ........................................... 386/54; 386/96
(58) Field of Search .............................. 386/54, 52, 55, 386/75, 95, 96, 104, 4, 6, 39, 68, 69; 704/245, 200; 382/224, 159; H04N 5/93, 7/04

(56) References Cited

U.S. PATENT DOCUMENTS 6,009,392 A * 12/1999 Kanevsky et al.
6,404,925 B1 * 6/2002 Foote et al.

OTHER PUBLICATIONS

Hauptmann et al., "Text, Speech, and Vision for Video Segmentation: The Informedia™ Project".
Minami et al., "Enhanced Video Handling Based on Audio Analysis," IEEE, 1997, pp. 219–226.
Chang et al., "Integrated Image and Speech Analysis for Content-Based Video Indexing".

* cited by examiner

*Primary Examiner*—Robert Chevalier
(74) *Attorney, Agent, or Firm*—Donald B. Paschburg; F. Chau & Associates, LLP

(57) ABSTRACT

A system for browsing and editing video, in accordance with the present invention, includes a video source for providing a video document which includes audio information, and an audio classifier coupled to the video source, the audio classifier being adapted to classify audio segments of the audio information into a plurality of classes. An audio spectrogram generator is coupled to the video source for generating spectrograms for the audio information to check that the audio segments have been identified correctly by the audio classifier. A browser is coupled to the audio classifier for searching the classified audio segments for editing and browsing the video document. A method for editing and browsing a video, in accordance with the invention, includes providing a video clip including audio, and segmenting and labeling the audio into music, silence and speech classes in real-time. The step of determining pitch for the speech class to identify and check changes in speakers and browsing the changes in speaker and the audio labels to associate the changes in speaker and the audio labels with frames of the video clip are also included.

28 Claims, 3 Drawing Sheets

METHOD AND SYSTEM FOR VIDEO BROWSING AND EDITING BY EMPLOYING AUDIO

BACKGROUND

1. Technical Field

This disclosure relates to video browsing and editing, and more specifically, to a video browsing and editing method and apparatus, which is supported by audio browsing and labeling capabilities.

2. Description of the Related Art

Content of a story is mostly included in audio information, i.e. one must listen to the audio to understand content. The common visual signature of a person is their face, and it is more difficult task to detect and match faces from all angles. In addition, the face of the speaker may not appear in a video while he/she is talking. Visual information in most cases is not enough to tell the story, however. Thus, the silent movies were supported by text. Audio is employed in addition to the visual information to enhance our understanding of the video. Continuous speech recognition with natural language processing can play a crucial role in video understanding and organization. Although current speech recognition engines have quite large vocabularies, continuous speaker and environment independent speech recognition is still, for the most part, out of reach, (see, e.g., Y. L. Chang, W. Zeng, I. Kamel, and R. Alonso, "Integrated image and speech analysis for content-based video indexing," in Proc. of the Int'l Conf. on Multimedia Computing and Systems, (Hiroshima, Japan), pp. 306–313, IEEE Computer Society, Jun. 17–21 1996). Word spotting is a reliable method to extract more information from the speech. Hence, a digital video library system, described by A. Hauptmann and M. Smith in "Text, Speech, and Vision for Video Segmentation: The Informedia™ Project," applies speech recognition and text processing techniques to obtain the key-words associated with each acoustic "paragraph" whose boundaries are detected by finding silence periods in the audio track. Each acoustic paragraph is matched to the nearest scene break, allowing the generation of an appropriate video paragraph clip in response to a user request. This work has also shown that combining of speech, text and image analysis can provide much more information, thus improving content analysis and abstraction of video compared to using one media only.

There exist many image, text, and audio processing supported methods to understand the content of the video; however, video abstraction is still a very difficult problem. In other words, no automatic system can do the job of a human video cataloger. Automatic techniques for video abstraction are important in the sense that they can make the human cataloger's job easier. However, the cataloger needs tools to correct the mistakes of the automatic system and interpret the content of the audio and image sequences by looking to the efficient representations of these data.

Content of a story is mostly included in speech information, i.e. one must listen to the audio to understand the content of the scene. In addition, music is found to play an important role in expressing the director's intention by the way it is used. Music also has the effect of strengthening the impression and the activity of dramatic movies. Hence, speech and music are two important events in the audio track. In addition, speech detection is a pre-processing step to speech recognition and speaker identification.

Traditionally silence has been an important event in telecommunications. Silence detection is well known from telephony. Many of the silence detection techniques rely on computing the power of the signal in small audio frames (usually 10 or 20 msec long portions of the signal) and thresholding. However, segmenting audio into speech and music classes is a new research topic. Recently, several methods are proposed for segregation of audio into classes based on feature extraction, training, and classification.

Audio analysis for video content extraction and abstraction can be extended in several ways. All of the above audio segmentation methods fail when the audio contains multiple sources.

Speaker-based segmentation of the audio is widely used for non-linear audio access. Hence, the speech segments of the audio can be further divided into speaker segments. Although speaker verification and identification problems have been studied in detail in the past, segmentation of the speech into different speakers is a relatively new topic.

In review, audio-visual communication is often more effective than only audio only text based communication. Hence, video, and more particularly, digital video is rapidly becoming integrated into typical computing environments. Abstraction of the video data has become increasingly more important. In addition to video abstraction, video indexing and retrieval has become important due to the immense amount of video stored in multimedia databases. However, automatic systems that can analyze the video and then extract reliable content information from the video automatically have not yet been provided. A human cataloger is still needed to organize video content.

Therefore, a need exists for a video browsing system and tools to facilitate a cataloger's task of analyzing and labeling video. A further need exists for enhancing the existing video browsers by incorporating audio based information spaces.

SUMMARY OF THE INVENTION

A system for browsing and editing video, in accordance with the present invention, includes a video source for providing a video document including audio information and an audio classifier coupled to the video source. The audio classifier is adapted to classify audio segments of the audio information into a plurality of classes. An audio spectrogram generator is coupled to the video source for generating spectrograms for the audio information to check that the audio segments have been identified correctly by the audio classifier. A browser is coupled to the audio classifier for searching the classified audio segments for editing and browsing the video document.

In alternate embodiments, the system may include a pitch computer coupled to the video source for computing a pitch curve for the audio information to identify speakers from the audio information. The pitch curve may indicate speaker changes relative to the generated spectrograms to identify and check speaker changes. The speaker changes are preferably identified in a speaker change list. The speaker change list may be identified in accordance with an audio label list wherein the audio label list stores audio labels for identifying the classes of audio. The system may include a speaker change browser for browsing and identifying speakers in the audio information. The system may further include a memory device for storing an audio label list, and the audio label list may store audio labels associated with the audio information for identifying the audio segments as one of speech, music and silence. The system may further include a video browser adapted for browsing and editing video frames. The video browser may provide frame indices for the video frames, the video frames being associated with audio labels and spectrograms to reference the audio information with the video frames.

A method for editing and browsing a video, in accordance with the present invention, includes providing a video clip including audio, segmenting and labeling the audio into music, silence and speech classes in real-time, determining pitch for the speech class to identify and check changes in speakers and browsing the changes in speaker and the audio labels to associate the changes in speaker and the audio labels with frames of the video clip.

In other methods, the step of segmenting and labeling the audio into music, silence and speech classes in real-time may include the step of computing statistical time-domain features, based on a zero crossing rate and a root mean square energy distribution for audio segments. The audio segments may include a length of about 1.2 seconds. The step of segmenting and labeling the audio into music, silence and speech classes in real-time may include the step of classifying audio segments into music or speech classes based on a similarity metric. The similarity metric may be based on a distance measurement between feature vectors.

In still other methods, the step of segmenting and labeling the audio into music, silence and speech classes in real-time may include the step of detecting silence in the audio using energy and zero crossing rates computed for the audio. The step of browsing the changes in speaker and the audio labels to associate the changes in speaker and the audio labels with frames of the video clip may include the steps of editing the video clip based on one of the changes in speaker and the audio labels. The step of editing may include the step of splitting a block including an audio event or speaker segment into two blocks. The step of editing may include the step of merging at least one of the two blocks with another block. The step of editing may include the step of playing the edited video clip. The above methods and method steps may be implemented by a program storage device readable by machine, tangibly embodying a program of instructions executable by the machine to perform method steps for editing and browsing a video.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

Figure 1:
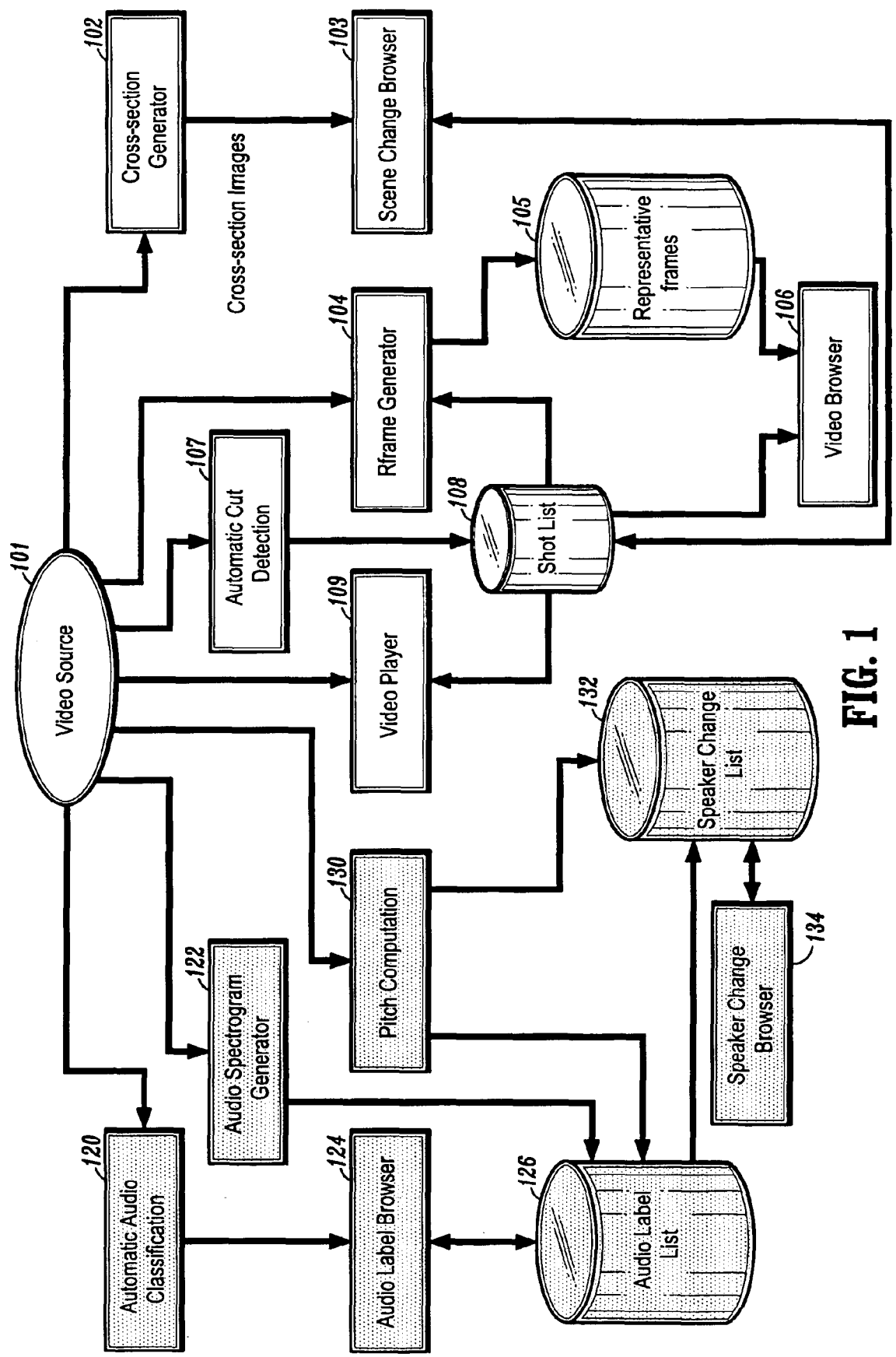
FIG. 1 is a block/flow diagram for a system/method for editing and browsing a video by employing audio in accordance with the present invention.

The present invention is directed to audio and video browsing. Analysis of an audio track of a video for this disclosure concentrates on audio browsing. The present invention, employs a spectrogram of audio sequences to visualize the audio content in the video. Audio spectrograms are used for video indexing, archiving and browsing systems to address visual representation of the audio.

In an initial step for audio analysis, audio of a video is segregated into three classes, e.g., speech, music and silence. Note that, after segmenting the video into speech, music and silence classes (labels), and the speech segments are then further separated into different speaker classes. This information is incorporated into a video abstraction system design. Thus, a real-time solution is provided for segmenting audio into music, silence and speech classes.

Audio spectrograms also include information about different events in the audio, which can be deciphered readily by an experienced user. Spectrums of music and speech have different patterns. Speech spectral power is localized to either low or high frequencies depending on the spoken phoneme. However, music spectral power covers a larger band and users can observe steady power at certain frequencies, known as harmonics.

Pitch, perceived frequency in a spectrum in which the frequency of every component is a multiple of the perceived frequency, also plays a role in human hearing. Human voices mainly differ in their pitches, i.e., a woman has higher pitch thus a softer voice, and man has lower pitch thus a stronger voice. In music, the harmonics also play a role. The frequency of the main harmonic determines the sound. In one embodiment of the present invention, the pitch curve is presented to the user as well to help the speaker change detection process.

To provide access to the semantic context in the audio and visual tracks of the video in a browsing environment, one embodiment of the present invention includes a computer program product for browsing and editing videos, which may include a computer readable storage medium having a computer program stored thereon for performing the steps of: (a) dividing the audio sequence into speech, music, and silence classes; (b) computing the pitch curve of the audio sequence; (c) computing the spectrogram of the audio; (d) detecting scene changes, i.e., shots; (e) generating representative frames for each shot, (f) generating cross-section images; and (g) editing video related information spaces. Step (g) may further include (i) a video player; (ii) a video browser; (iii) a scene change browser; (iv) an audio label browser; and (v) a speaker change browser.

The present invention is not limited to the illustrative examples described herein and may be with other audio/video browsing tools. It should be understood that the elements shown in FIGS. 1–4 may be implemented in various forms of hardware, software or combinations thereof. Preferably, these elements are implemented on one or more appropriately programmed general purpose digital computers having a processor and memory and input/output interfaces.

Referring now in specific detail to the drawings in which like reference numerals identify similar or identical elements throughout the several views, and initially to FIG. 1, a block/flow diagram of a system/method for labeling and identifying audio segments and video frames in an audio video clip is illustratively shown. By the present invention, several levels of abstraction for video browsing and editing are employed. An original video is provided from a video source 101.

Video source 101 may include digital data stored on a disk in a program storage device, such as a compact, disk, DVD, magnetic storage or other storage device. Vide source may include analog recording as well, which may include magnetic media or the like. Video source 101 may include a video recorder, a transmission link, such as, for example, cable, satellite, a telephone connection, e.g., an Internet connection or any other source of video information. Video source 101 provides both video images and accompanying audio, which may include speech, silence (noise) and/or music.

In one embodiment, no shot detection method offers 100% accuracy rate, there will always be missed or misdetected shots. To accommodate this, cross-section images that are generated by a cross-section generator 102 from the original video are provided to a scene change browser 103 to verify and update scene-change detection results. The cross-section generator 102 takes the visual track of the video as an input and generates an image whose rows (or columns) correspond to a compact representation of the visual content in the frame of the video. In a preferred embodiment of the present invention, the compact representation of a frame in the video is computed by taking both horizontal and vertical scanlines through the middle of each frame.

Representative frames of the original video are generated by a representative frame (Rframe) generator 104 and associated with portions of the original video. Representative frames are frames, which typify a larger segment of video. The representative frames are stored in memory 105 for use with a video browser 106, which may be employed for reviewing the representative frames of the original video. Concatenated representative frames from memory 105 for each detected shot are employed as video browser 106 to access to the scenes in the video easier and faster. By picking these representative frames, the video browser 106 permits a user to play the video from the starting frame of the corresponding shot. Therefore, fast forward and rewind functions are not needed to find the scene in the video. The representative frame helps to find and play back the scene from the correct position.

Shots of the original video are detected by employing an automatic cut detector 107 which detects scene changes in the original video and records frame numbers and other information in a shot list 108. Shot list 108 may be browsed by employing scene change browser 103 to browse through the different scenes of the original video. Shot list 108 may be viewed on a video player 109, which may include a computer having a display screen or a video recorder and a television, for example.

In accordance with the present invention, abstraction levels are also based on audio analysis. A first level of abstraction is provided by the segmentation of audio into music, speech and silence classes in block 120. An audio label browser 124 provides labels for each class of audio and enables searching or browsing through audio segments. Similarly, audio segmentation methods do not work with 100% accuracy rate, there will always be misdetected classes. An audio spectrogram is employed to verify and update these classes in an audio label list 126. The audio spectrogram is provided by an audio spectrogram generator 122.

Another abstraction level is provided by the speaker changes. A pitch computation of the original video is performed in block 130. A pitch curve is employed to help both the speaker change labeling for generating a speaker change list 132 and audio classification understanding in audio label list 126. Speaker change list 132 is capable of being browsed for different speakers by employing a speaker change browser 134. Further, audio label list 126 may also be searched for music, speech or sounds by employing audio label browser 124.

Figure 2:
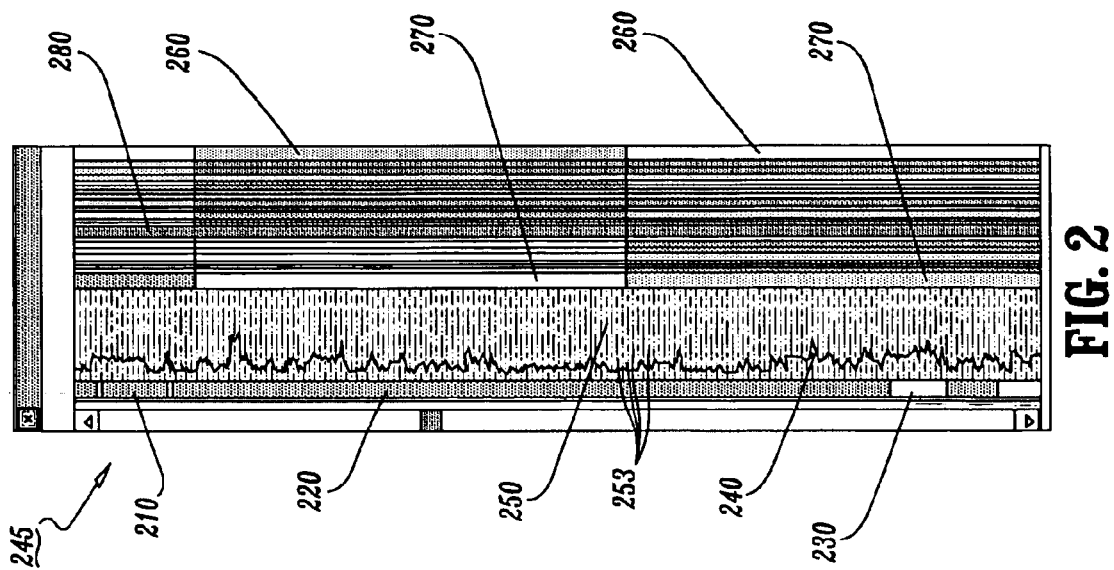
FIG. 2 depicts a scene change browser, an audio label browser and a speaker change browser in accordance with one embodiment of the present invention.

The audio labels and speaker change browser interfaces (browsers 126 and 134, respectively) are shown with the scene change browser 102, and cross-section images, in FIG. 2.

Referring to FIG. 2, horizontal and vertical cross-section images 280 are shown. Each horizontal scanline 253, e.g., each row in the audio spectrogram 250 image corresponds to the audio content associated with a frame in the original video. Each audio class is represented by a color in a vertical bar in browsing tool 245. Different colors or patterns correspond to speech 220, music 230 and silence 210. The speaker boundaries are also signaled using vertical bars 270. The colors change as the speakers change, for example. Similarly, the scene changes are represented by vertical bar 260. In addition, pitch curve 240 is drawn onto the audio spectrogram 250 in this illustrative interface.

Figure 3:
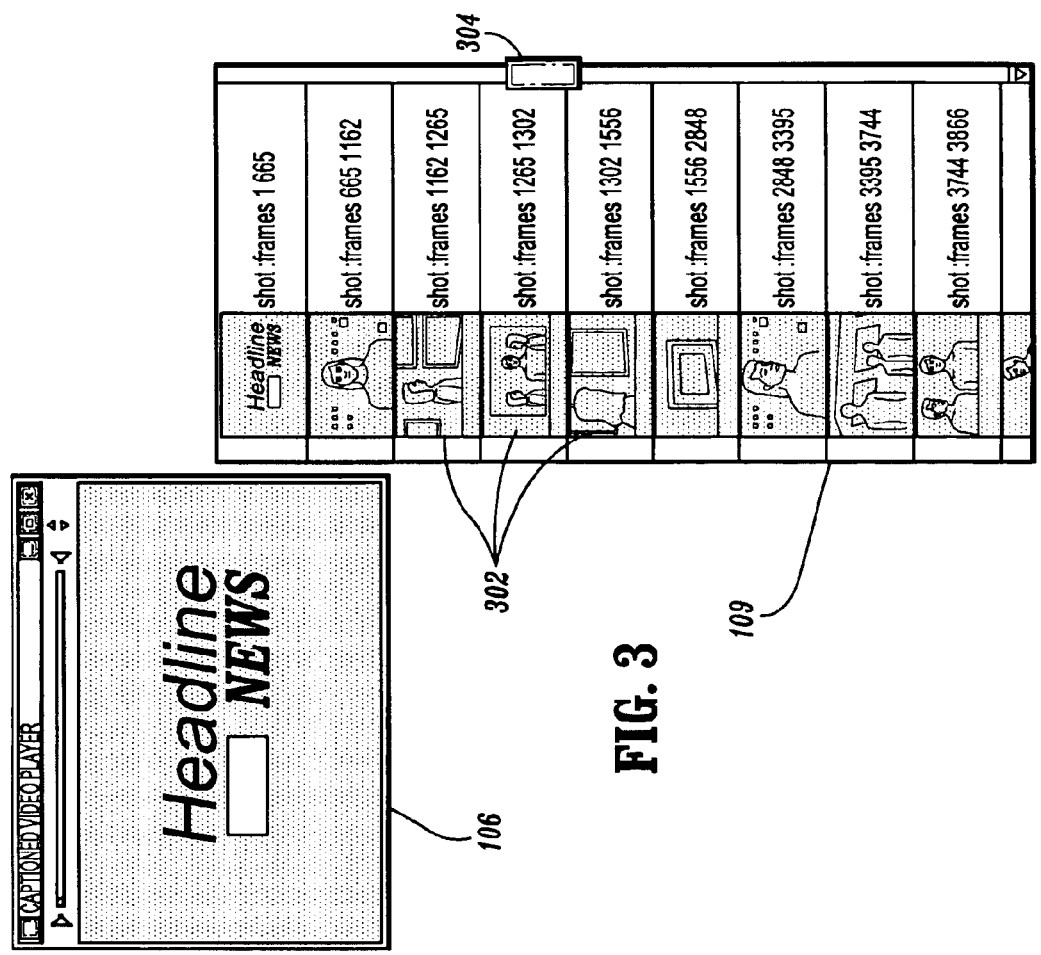
FIG. 3 depicts a video player and a browser, which may be employed with the present invention.

Referring to FIG. 3, an illustrative video browser 106 and an illustrative video player 109 are depicted. Video browser 109 includes a representative frame 302 for each shot. Shots are comprised of frames. Video browser 109 makes the representative frames 302 for each shot available for viewing as well as the frames included in each shot. A user can scroll through these images and select a shot of interest by employing scroll bar 304.

Other features may be employed for browsing and editing the shots, such as, providing a graphical user interface having tools for playing and editing the shots on a frame-by-frame (audio or video) basis or on a shot-by-shot basis.

Referring again to FIG. 1, a real-time method for segmenting audio into speech, music and silence classes in accordance with the present invention will now be described. The present invention preferably employs time-domain statistical features in block 120. In one embodiment, three features derived from the distribution of Zero Crossing rate (ZCR) and an amplitude envelope of an audio sequence are employed. ZCR is defined as the number of times the audio sequence changes sign in a given period. A period is also known as an audio frame and may be from about 10 to about 20 msec long.

ZCR is used for getting an idea about a power spectrum of an audio signal without computing its Fourier Transform. When the audio signal includes mainly high frequency components, then the ZCR is high. Due to the way that humans generate voices, the envelope of a speech signal includes many peaks. The root mean square of energy (RMSE) increases with voice sounds (a voiced signal) and decreases during the silence period between two words. For music, the RMSE envelope is quite smooth, and there is usually a steady offset. The unvoiced sounds also have low energies.

Similar to the RMSE, the ZCR also varies significantly during speech. The voiced/unvoiced sounds are low/high frequency signals. In every language, words are composed of voiced and unvoiced sounds. A ZCR envelope for music is also quite smooth. The more powerful components of the many sounds produced by musical instruments are typically under 4500 Hertz. Hence, the spread of the ZCRs rate for music is low.

Figure 4:
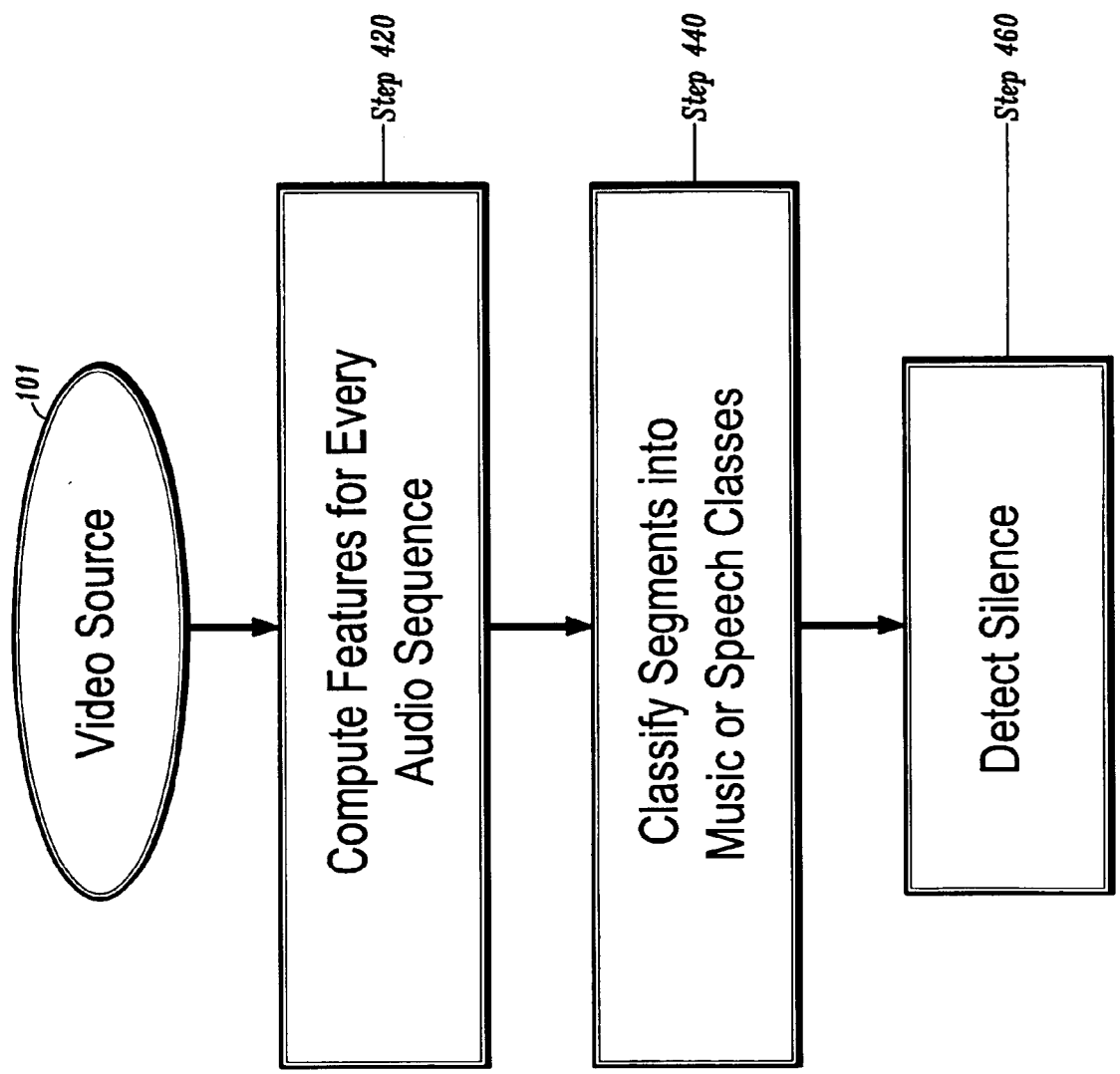
FIG. 4 is flow diagram for segmenting the audio sequence into music, speech and silence in accordance with the present invention.

Referring to FIG. 4 with continued reference to FIG. 1, starting from the beginning of audio in the original video, the ZCR and Root Mean Square Energy (RMSE) are computed in audio sequences, for example, 120 non-overlapping audio frames of 10 msec long, i.e., 1.2 seconds long in total for each sequence. Then, the mean ZCR ($\mu_{zcr}$) and RMSE ($\mu_{rmse}$) and computed, and the minimum and maximum ZCR are found. The minimum and maximum ZCR may be denoted by $\min_{zcr}$ and $\max_{zcr}$, respectively.

In one embodiment, a parameter called a Third Central Moment $$( = \sum_{i=1}^{120} (ZCR_i - \mu_{ZCR})^3,$$

in this example, for a 120 frame audio sequence) of the ZCR for audio frames is employed as a first feature. The Third Central Moment characterizes the asymmetry of the distribution of the ZCRs for the audio frames in a 1.2 sec long audio sequence. A second feature is computed by finding the absolute difference of the total number of ZCRs that are larger than $$\frac{\max_{zcr} + \mu_{zcr}}{2},$$

and the number of ZCRs that are smaller than $$\frac{\mu_{zcr} - \min_{zcr}}{2}.$$

A number of audio frames are selected having an RMSE energy of less than $$\frac{\mu_{rmse} - \min_{rmse}}{2}$$

as a third feature, where $\min_{rmse}$ denotes the minimum of the RMSE for audio frames. By taking the LOG magnitudes of these features, a feature vector is constructed with the three elements described previously in step 420. This vector determines which class the current audio segment (120 audio frames of 10 msec long=1.2 sec) is. It is to be understood that other features may be employed in addition to or instead of the three features employed above for the feature vectors for speech. All the audio frames in the audio segment or sequence are labeled with the estimated class. The step 420 is repeated for each audio segment, until the end of the audio is reached.

In step 440, a Multivariate Gaussian classifier may be employed to assign the audio segment into speech or music classes. Mean vector and covariance matrices are computed for each class using training sets, for example, training sets having a length of about 30 minutes. The speech training set may include audio clips of female and male dialogs from various sources such as News programs, Sitcoms, video clips, etc. Music training sets may include short or long instrumental music from various types, such as Classical, Jazz, Pop & Rock, etc.

A Mahalanobis distance is computed for every feature vector (corresponding to each audio segment). For example, if the current feature vector is defined as v, then the Mahalanobis distance is defined as $d_c=(v-\mu_c)K_c^{-1}(v-\mu_c)^T$, where $\mu$ and K denote the mean vector and covariance matrix for class c, namely speech or music (−1 and T denote inverse and transpose matrix operations). The audio segment is assigned to the class with the smallest Mahalanobis distance in step 440 (and block 120 of FIG. 1).

The inventors have experimented with classifying the music and speech on news broadcast videos. The precision and recall rates are above 90% when the audio is sampled at 22050 Hertz. These rates fall off a bit at lower sample rates. Audio clips may be segmented into pieces based on the context or the content.

After all the audio segments are assigned to a class, all audio frames are checked and threshold values are determined for their RMSE's and ZCR's. The threshold for RMSE is computed automatically based on the statistics of the RMSE values of the audio frames for the audio sequence. The threshold for RMSE is computed preferably as $T_{rmse}=0.8 \times MIN_{rmse}+0.2 \times MAX_{rmse}$. In this equation $MIN_{rmse}$ and $MAX_{rmse}$ refer to the minimum and maximum among all RMSE values for each audio frame. The ZCR threshold may be calculated as an average or set to a predetermined value. The ZCR may be set to 10, (picked experimentally) although other thresholds may be employed.

A binary sequence is obtained over the audio frame indices, in time, based on the thresholded RMSE and ZCR values. If both values are at any instant larger than their corresponding thresholds, the value of the binary sequence is set to 1, otherwise the value is set to zero. Then, the binary sequence is filtered, for example, by using a 21 tab median filter. The segments of this curve with value 1 throughout are changed from the music or speech classes determined in step 440 to a silence class in step 460.

In one embodiment, the audio frames are about 10 msec long, whereas the video frames are about 33–40 msec long for NTSC/PAL (National Television Systems Committee/Phase Alternation Line) video. The audio classes are represented in terms of the video frame unit in the browsing tool (see FIG. 3). Hence, the audio label list 126 is downsample corresponding to the video format before painting or generating the browsing tool. In this way, the audio and the video are associated in time.

To compute a spectrogram image by employing audio spectrogram generator 122 (FIG. 1), an image representation of a time-varying amplitude of each frequency component in the audio is provided. In one example, a 256 point Fast Fourier Transform (FFT) of the audio sequence is taken for every frame of the video sequence. The audio sequence is multiplied by an 80 msec long Hamming window. The high frequency components of the audio sequence are then emphasized, for example, by employing a conventional high pass filter. After we compute the FFT of the resulting audio sequence, the maximum and minimum values are found among all power spectrums. A power spectrum of a sequence is computed by multiplying its FFT with the conjugate of the FFT. Based on these values, the power spectrum of each audio sequence is normalized, and the values are mapped to a color uniformly based on a table to obtain the spectrogram image (see, e.g., spectrogram 250 FIG. 2). Hence, a horizontal scanline in area 50 of the image in FIG. 2 is a one dimensional power spectrum curve for the audio sequence for a video frame.

The audio spectrogram also includes semantic information which is easily deciphered by an experienced user. The spectrum of music or speech has different patterns. Hence, the experienced user can correct the mistakes of the automatic audio classification in block 120 of FIG. 1, if needed.

Cepstral analysis or other techniques, known to those skilled in the art, may be employed to compute the pitch (see, e.g., pitch curve 240 of FIG. 2) of the audio sequence for every frame in block 130 of FIG. 1. Pitch is the perceived fundamental frequency of a sound. Fundamental frequency is the frequency in a spectrum in which the frequency of every component is a multiple of the fundamental frequency.

The pitch curve for music is very steady at several levels due to the nature of the musical sound production. The pitch curve for speech varies significantly. During a voiced phoneme, pitch values are low and change very smoothly. However, the pitch curve takes quite large numbers and varies like noise during silence and unvoiced sounds.

Referring again to FIG. 1, video browser 106 has cutting, pasting and video playing capabilities. Scene change 103, speaker change 134 and audio label 124 browsers all have splitting, merging and video playing capabilities for audio and/or video clips/segments. All of these browsers also save the resulting information into corresponding lists, e.g., scene change (shot list 108 ), audio label list 126, and speaker change list 132, for indexing and retrieval purposes. In addition, the video player 109 can display closed-captioning if available (see, e.g., FIG. 3).

If the closed-caption text is available with the video, then the invention starts with one speaker block. If the closed-caption text is available, the invention employs the speaker change signals in the text to segment video into different speakers. Using the video player and information from the pitch curve (240) and audio spectrogram (250) the user can further segment or correct the segmentation using the split and merge functionality of the speaker change browser 134. Blocks including an audio segment (for a given audio event) or speaker segment can be split into multiple blocks and merged with one or more other segments for editing the video clip using the audio label of speaker change browsers. The present invention provides enhancements to the existing video browsing and editing apparatuses by incorporating semantic and visual information obtained from the audio track of the video. Semantic information is provided to the user by the means of segmenting the audio into music, speech and silence classes, audio spectrogram, pitch curve and speaker based video segmentation. Each of these classes directly or indirectly conveys the content of the video. A novel audio segmentation method in also included. The methods and systems of the present invention employ time-based features and run in real-time. The efficacy of the segmentation method is reported at different audio sampling rates. A colored spectrogram may be computed as the visual information of the audio.

Having described preferred embodiments for methods and system for video browsing and editing by employing audio (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by letters patent is set forth in the appended claims.

What is claimed is:

1. A system for browsing and editing video comprising:
a video source for providing a video document including audio information;
an audio classifier coupled to the video source, the audio classifier adapted to classify audio segments of the audio information into a plurality of classes;
an audio spectrogram generator coupled to the video source for generating spectrograms for the audio information to check that the audio segments have been identified correctly by the audio classifier; and
a browser coupled to the audio classifier for searching the classified audio segments for editing and browsing the video document.

2. The system as recited in claim 1, further comprising a pitch computer coupled to the video source for computing a pitch curve for the audio information to identify speakers from the audio information.

3. The system as recited in claim 2, wherein the pitch curve indicates speaker changes relative to the generated spectrograms to identify and check speaker changes.

4. The system as recited in claim 3, wherein the speaker changes are identified in a speaker change list.

5. The system as recited in claim 4, wherein the speaker change list is further identified in accordance with an audio label list wherein the audio label list stores audio labels for identifying the classes of audio.

6. The system as recited in claim 1, further comprising a speaker change browser for browsing and identifying speakers in the audio information.

7. The system as recited in claim 1, further comprising a memory device for storing an audio label list, the audio label list for storing audio labels associated with the audio information for identifying the audio segments as one of speech, music and silence.

8. The system as recited in claim 1, further comprising a video browser adapted for browsing and editing video frames, the video browser providing frame indices for the video frames, the video frames being associated with audio labels and spectrograms to reference the audio information with the video frames.

9. A method for editing and browsing a video comprising the steps of:
providing a video clip including audio;
segmenting and labeling the audio into music, silence and speech classes in real-time;
determining pitch for the speech class to identify and check changes in speakers; and
browsing the changes in speaker and the audio labels to associate the changes in speaker and the audio labels with frames of the video clip.

10. The method as recited in claim 9, wherein the step of segmenting and labeling the audio into music, silence and speech classes in real-time includes the step of computing statistical time-domain features, based on a zero crossing rate and a root mean square energy distribution for audio segments.

11. The method as recited in claim 10, wherein the audio segments include a length of about 1.2 seconds.

12. The method as recited in claim 9, wherein the step of segmenting and labeling the audio into music, silence and speech classes in real-time includes the step of classifying audio segments into music or speech classes based on a similarity metric.

13. The method as recited in claim 12, wherein the similarity metric is based on a distance measurement between feature vectors.

14. The method as recited in claim 9, wherein the step of segmenting and labeling the audio into music, silence and speech classes in real-time includes the step of detecting silence in the audio using energy and zero crossing rates computed for the audio.

15. The method as recited in claim 9, wherein the step of browsing the changes in speaker and the audio labels to associate the changes in speaker and the audio labels with frames of the video clip includes the steps of editing the video clip based on one of the changes in speaker and the audio labels.

16. The method as recited in claim 15, wherein the step of editing includes the step of:
splitting a block including an audio event or speaker segment into two blocks.

17. The method as recited in claim 16, wherein the step of editing includes the step of:

merging at least one of the two blocks with another block.

18. The method as recited in claim 15, wherein the step of editing includes the step of:

playing the edited video clip.

19. A program storage device readable by machine, tangibly embodying a program of instructions executable by the machine to perform method steps for editing and browsing a video, the method steps comprising:

providing a video clip including audio;

segmenting and labeling the audio into music, silence and speech classes in real-time;

determining pitch for the speech class to identify and check changes in speakers; and browsing the changes in speaker and the audio labels to associate the changes in speaker and the audio labels with frames of the video clip.

20. The program storage device as recited in claim 19, wherein the step of segmenting and labeling the audio into music, silence and speech classes in real-time includes the step of computing statistical time-domain features, based on a zero crossing rate and a root mean square energy distribution for audio segments.

21. The program storage device as recited in claim 20, wherein the audio segments include a length of about 1.2 seconds.

22. The program storage device as recited in claim 19, wherein the step of segmenting and labeling the audio into music, silence and speech classes in real-time includes the step of classifying audio segments into music or speech classes based on a similarity metric.

23. The program storage device as recited in claim 22, wherein the similarity metric is based on a distance measurement between feature vectors.

24. The program storage device as recited in claim 19, wherein the step of segmenting and labeling the audio into music, silence and speech classes in real-time includes the step of detecting silence in the audio using energy and zero crossing rates computed for the audio.

25. The program storage device as recited in claim 19, wherein the step of browsing the changes in speaker and the audio labels to associate the changes in speaker and the audio labels with frames of the video clip includes the steps of editing the video clip based on one of the changes in speaker and the audio labels.

26. The program storage device as recited in claim 25, wherein the step of editing includes the step of:

splitting a block including an audio event or speaker segment into two blocks.

27. The program storage device as recited in claim 26, wherein the step of editing includes the step of:

merging at least one of the two blocks with another block.

28. The program storage device as recited in claim 25, wherein the step of editing includes the step of playing the edited video clip.

* * * * *